United States Patent
Baxter et al.

(10) Patent No.: US 6,432,217 B1
(45) Date of Patent: Aug. 13, 2002

(54) PROCESS FOR TREATMENT OF CONTACT LENSES

(75) Inventors: William Ronald Stuart Baxter, Cambridge; Jindrich Vosahlo, Cambridgeshire, both of (GB)

(73) Assignee: Ocular Sciences, Inc, Concord, CA (US)

(*) Notice: Subject to any disclaimer, the term of this patent is extended or adjusted under 35 U.S.C. 154(b) by 0 days.

(21) Appl. No.: 09/556,149

(22) Filed: Apr. 21, 2000

(30) Foreign Application Priority Data

Apr. 24, 1999 (GB) ............................................. 9909476

(51) Int. Cl.[7] .......................... G02C 13/00; B29D 11/00
(52) U.S. Cl. .............................. 134/18; 134/34; 134/36; 134/42; 134/901; 422/28; 422/106; 422/110
(58) Field of Search ............................... 134/18, 26, 34, 134/36, 901, 42; 422/1, 28, 106, 110

(56) References Cited

U.S. PATENT DOCUMENTS

| | | | | |
|---|---|---|---|---|
| 5,616,184 A | * | 4/1997 | Duncan et al. | 134/22.1 |
| 5,636,647 A | * | 6/1997 | Keene et al. | 134/102.2 |
| 5,649,410 A | * | 7/1997 | Martin et al. | 53/474 |
| 6,012,471 A | * | 1/2000 | Calvin et al. | 134/58 |
| 6,068,798 A | * | 2/2000 | Lesczynski et al. | 264/2.6 |
| 6,071,112 A | * | 6/2000 | Calvin et al. | 425/445 |
| 6,183,236 B1 | * | 2/2001 | Lesczynski et al. | 425/445 |
| 6,207,086 B1 | * | 3/2001 | Schlagel et al. | 264/2.6 |

FOREIGN PATENT DOCUMENTS

| | | | | |
|---|---|---|---|---|
| EP | 0453231 A2 | * | 10/1991 | B29D/11/00 |
| EP | 0645235 A2 | * | 3/1995 | B29D/11/00 |
| WO | WO 97/13635 | * | 4/1997 | B29D/11/00 |

* cited by examiner

Primary Examiner—Randy Gulakowski
Assistant Examiner—J. Smetana
(74) Attorney, Agent, or Firm—Stout, Uxa, Buyan & Mullins, LLP; Frank J. Uxa

(57) ABSTRACT

A contact lens is disposed in a well containing hydration fluid, such that a concave surface of the lens faces upwardly and the lens is submerged in the hydration fluid, thereby allowing contaminants to leach out of the lens into the hydration fluid. After hydration, a washing fluid is introduced into the well and contaminated hydration fluid is removed from the well so as to replace at least some of the contaminated hydration fluid in the well with the washing fluid in a predetermined fluid-exchange procedure. The washing fluid is introduced into the well so as to be directed against the concave surface of the lens and the contaminated hydration fluid is removed at a removal location remote from where the washing fluid impinges against the lens, such that the action of the introduced washing fluid serves to oppose The predetermined fluid-exchange procedure is monitored so as to establish whether the predetermined fluid-exchange procedure has been correctly performed.

26 Claims, 2 Drawing Sheets

PROCESS FOR TREATMENT OF CONTACT LENSES

Figure 1:
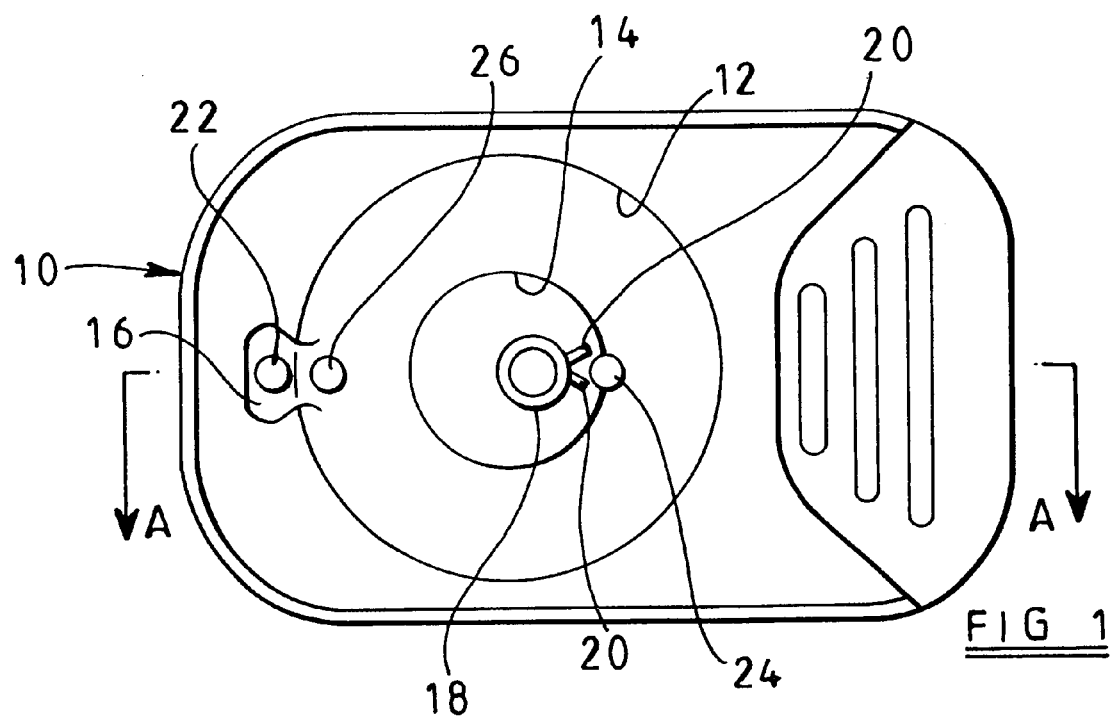

This invention relates to a process for the treatment of contact lenses and is particularly concerned with post-polymerization treatment of contact lenses in a method of manufacturing hydrated soft contact lenses.

It is known, after moulding contact lenses from a hydratable plastics material, to hydrate the lenses at an elevated temperature in a vessel containing a hydration fluid such as a 1% by wt. sodium bicarbonate solution. Following hydration, the contact lenses are removed from the vessel, washed and then introduced into individual receptacles or wells where they are immersed in saline solution; the wells are then closed and sealed with a foil cover so that the contact lenses are stored individually in packages in saline solution for distribution and sale. However, such a procedure causes problems in handling of the lenses during and after hydration. It is particularly difficult to handle contact lenses after hydration because they are relatively soft and prone to damage.

It is also known to hydrate contact lenses in the final packages in which they are sealed, distributed and sold. However, unwanted contaminants resulting from the polymerisation reaction leach out of the lenses into the surrounding fluid in which the lenses are packaged. This can cause irritation to the lens wearer. High levels of certain contaminants may not be permissible in some countries.

It is an object of the present invention to provide an improved method of treating contact lenses in a method of manufacturing hydrated soft contact lenses which permits the removal of unwanted contaminants from soft contact lenses during their manufacture.

According to a first aspect of the present invention there is provided a method of treating a contact lens disposed in a well containing hydration fluid, such that a concave surface of the lens faces upwardly and the lens is submerged in the hydration fluid, thereby allowing contaminants to leach out of the lens into the hydration fluid, comprising the steps of:
  introducing, after hydration of the lens is complete, a washing fluid into the well and removing contaminated hydration fluid from the well so as to replace at least some of the contaminated hydration fluid in the well with the washing fluid in a predetermined fluid-exchange procedure,
  wherein the washing fluid is introduced into the well so as to be directed against the concave surface of the lens and the contaminated hydration fluid is removed at a removal location remote from where the washing fluid impinges against the lens, such that the action of the introduced washing fluid serves to oppose movement of the lens towards the removal location.

Prior to introduction of the washing fluid, the method preferably includes the steps of:
  (i) introducing the lens hydration fluid into the well directed against the upwardly facing concave surface of the lens so as to control the position of the lens within the well, until the lens is submerged; and
  (ii) allowing sufficient time for the lens to hydrate and for contaminants to leach from the lens.

It will be appreciated that, during hydration, the lens swells and changes shape and it is important to maintain the lens submerged in the hydration fluid during this procedure without constraining it unduly. By directing the lens hydration fluid against the lens, the lens can be maintained in position within the well and prevented from floating on the hydration fluid as the well is filled.

Preferably, the washing fluid is introduced in at least two streams which are preferably mutually inclined so as to be directed against different regions of the lens. The washing fluid preferably has substantially the same chemical composition as the hydration fluid although the washing fluid may be at least partially constituted by lens storage fluid (e.g. saline).

Preferably, the contaminated hydration fluid is removed in at least two separate steps during which removal of the contaminated hydration fluid takes place at a greater rate than introduction of the washing fluid, the removal and introduction being timed so that sufficient fluid remains in the well to ensure that the lens remains submerged.

Contaminants may leach into the washing fluid in the well, thus the method may include a step of removing contaminated washing fluid and replacing it with fresh washing fluid which maybe at least partially constituted by lens storage fluid. Preferably, the contaminated washing fluid is removed and the fresh washing fluid is introduced in the same way as the removal and introduction of the contaminated hydration fluid and the washing fluid respectively.

Most preferably, the well in which the method of the present invention is performed is a well in which the contact lens is sealed and stored for distributed and sale, and the method further includes the step of sealing the well with the contact lens therein. The well may provided by a container of the type disclosed in our copending International Patent Application No. WO 99/06300.

In the mass production of soft contact lenses, it is important to ensure that the lenses have been properly treated and, in some countries, regulations require rejection of lenses which have not been subjected to the required treatment (e.g. insufficient removal of impurities from the lenses).

According to a second aspect of the present invention there is provided a method of treating a contact lens disposed in a well containing hydration fluid, such that a concave surface of the lens faces upwardly and the lens is submerged in the hydration fluid, thereby allowing contaminants to leach out of the lens into the hydration fluid, comprising the steps of:
  introducing, after hydration of the lens is complete, a washing fluid into the well and removing contaminated hydration fluid from the well so as to replace at least some of the contaminated hydration fluid in the well with the washing fluid in a predetermined fluid-exchange procedure, and
  monitoring the predetermined fluid-exchange procedure, whereby to establish whether the predetermined fluid-exchange procedure has ben correctly performed.

The method of said second aspect may be used in combination with the method of said first aspect.

Preferably, said monitoring step utilises first and second level sensors for sensing the level of fluid in the well, the first level sensor being arranged to signal when the level of the fluid is at a first, relatively higher, level and the second sensor being arranged to signal when the level of the fluid in the well is at a second, relatively lower, level. Thus, in a preferred embodiment, a predetermined volume of the lens hydration fluid is introduced into the well (the predetermined volume of hydration fluid being such that, when the well and sensors are correctly mutually presented, the sensor (s) signal that the level of fluid is at least at the relatively lower level and preferably at the relatively higher level); following which the hydration fluid is removed from the well whilst supplying the washing fluid into the well, the rate of removal of the hydration fluid being greater than the introduction rate of the washing fluid so that the fluid level reduces until the second sensor indicates that the level of fluid has reached the second (relatively lower) level; following which fluid removal is stopped and subsequently fluid introduction is also stopped when the first sensor indicates that the level of fluid is at the first (relatively higher) level; and the monitoring step includes checking that the sensors have signalled in the correct sequence and at the correct times having regard to the predetermined fluid-exchange procedure. If the predetermined procedure has not been validated, then the contact lens is rejected.

Preferably, the fluid removal during the fluid-exchange procedure is conducted in more than one discrete step. In a preferred embodiment, the level of the fluid in the well fluctuates around the lower level, the fluid removal being stopped and started under the control of the second sensor.

In an alternative embodiment, fluid removal is stopped when the second sensor indicates that the fluid has passed below the second level, and is started when the first sensor indicates that the fluid has reached the first level, so that the fluid fluctuates between the first and second levels.

It will be understood that the overall proportion of contaminated hydration fluid replaced by washing fluid in each exchange procedure is dependent upon the number of fluid removal steps performed, the rate and duration of washing fluid dosing and the efficiency of fluid mixing in the well.

As an alternative to introducing a predetermined volume of hydration fluid into the well, the hydration fluid may be introduced into the well until the first sensor indicates that the level of fluid is at the first (higher) level.

Preferably, the positioning of the second sensor is such as to ensure that the lens remains submerged throughout the fluid-exchange procedure.

Figure 2:
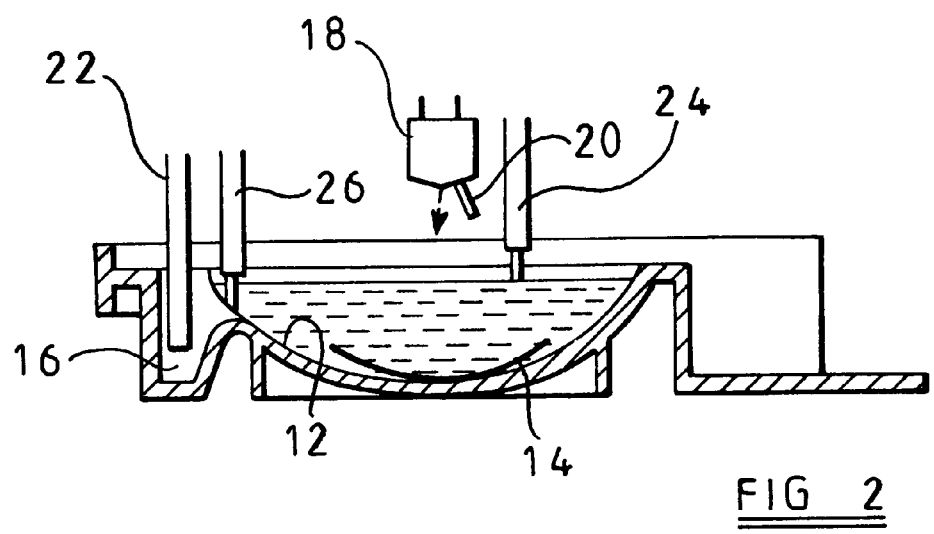
Figures 3, 4:
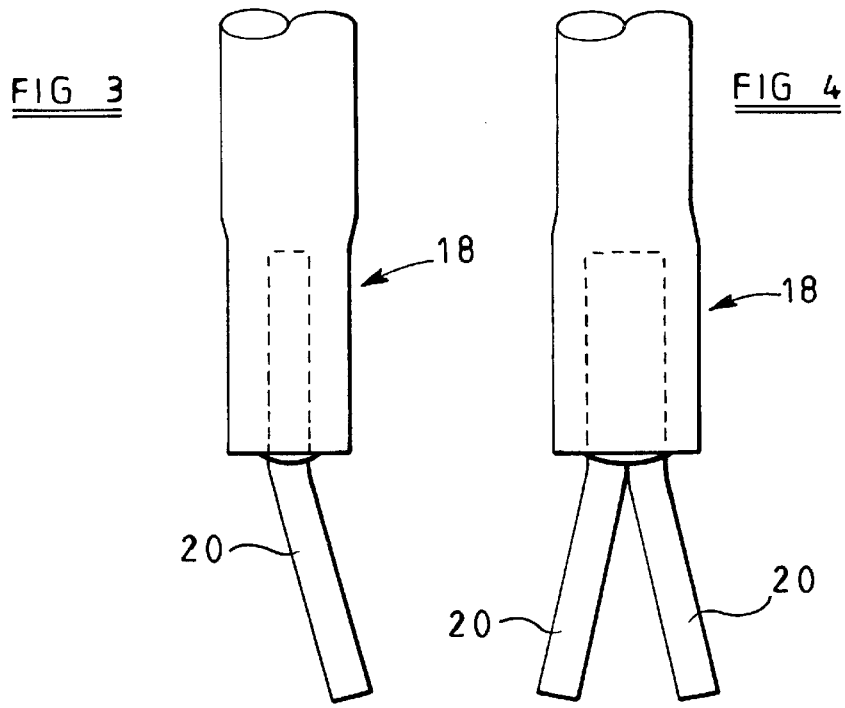
Figure 5:
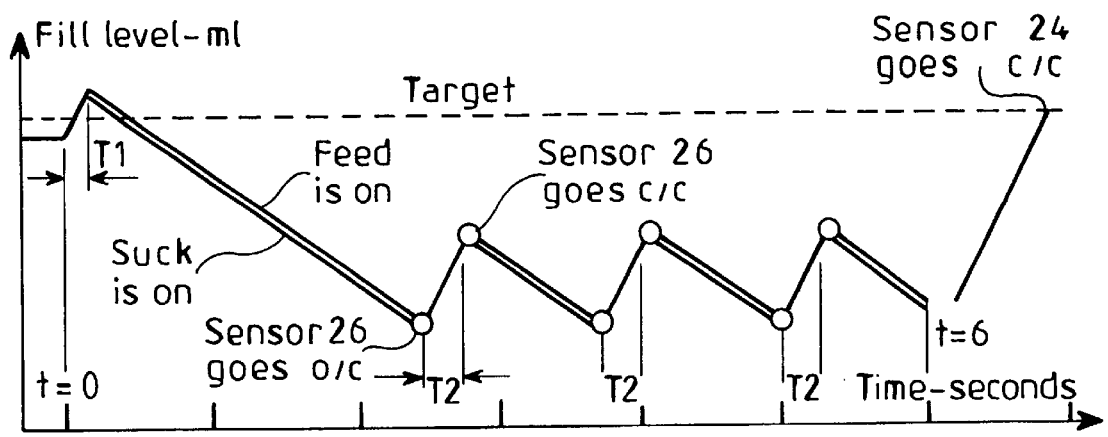

An embodiment of the present invention will now be described, by way of example, with reference to the accompanying drawings, in which:

FIG. 1 is a schematic view showing a hydrated contact lens in a well at a fluid exchange station in which a method in accordance with the present invention is performed, FIG. 2 is a section on the line A—A of FIG. 1, FIG. 3 is a side view of a supply head for lens washing fluid, FIG. 4 is another side view of the supply head taken at right angles to that of FIG. 3, and FIG. 5 is a plot of fill level against time illustrating a predetermined procedure for treating a contact lens disposed in a well.

Referring now to FIGS. 1 and 2 of the drawings, there is illustrated a container 10 which is generally of the type disclosed in our copending International Patent Application No. WO 99/06300. The container 10 comprises a well 12 having a part spherical base wall on which a moulded contact lens 14 to be treated rests with its concave surface facing upwardly. Adjacent to and in communication with the well 12 is a sump 16.

A supply head 18 for washing fluid is disposed above the container 10 and has a pair of outlet nozzles 20 which are mutually inclined at an angle of about 30° in a horizontal plane with respect to each other (see FIGS. 3 and 4). Both nozzles 20 extend at an angle of about 30° with respect to the vertical so as to be directed towards that side of the concave surface of the lens 14 which is remote from the sump 16.

A suction tube 22 is disposed within the sump 15. First and second sensors 24 and 26 are disposed with their lower ends extending into the well 12. The second sensor 26 extends further into the well 12 than the first sensor 24 and is disposed at the junction between the well 12 and the sump 16. The first sensor 24 is disposed on the opposite side of the supply head 18 to the second sensor 26. As can be seen from FIG. 1, the feed head 18, the suction tube 22 and the first and second sensors 24 and 26 are disposed on a line extending across the diameter of the well 12 and passing through the sump 16.

In operation of the method of the present invention, the lens 14 to be treated is typically cast moulded from hydroxyethyl methacrylate (HEMA) using a polymerisation initiator in a manner which is per se known in the art. After removal from the mould, the lens 14 is disposed in the well 12 with the concave surface of the lens 14 uppermost. A volume of hydration fluid (e.g. a 1 wt % sodium bicarbonate solution) at a temperature of >50° C. (eg 60° C.) is then dispersed from a single downwardly directed nozzle (not shown) such that the fluid impinges on the upwardly directed concave surface of the lens 14. During fluid dispense, impingement of the hydration fluid issuing from the nozzle against the lens 14 serves to hold it gently in the desired position and to ensure that the lens 14 remains submerged in the fluid. The volume of hydration fluid is such that the levels of hydration fluid in the well 12 will correspond to the level of the lower tip of the first sensor 24. At this time, the container 10 is introduced into a warm and moist environment to accelerate the removal of lens contaminated and to minimise fluid loss by evaporation, and is maintained therein for a predetermined period (eg about 5 mins) during which hydration of the lens 14 takes place and unwanted impurities such as unreacted HEMA, polymerisation initiator and reaction by-products start to be leached from the lens 14. After this predetermined interval, the now contaminated hydration fluid is replaced by a washing fluid (eg. 1 wt % solution of sodium bicarbonate) also at a temperature of >50° C. (eg 60° C.) in a fluid exchange process described below conducted at the fluid exchange station shown in FIG. 2.

At the end of the predetermined interval, a signal is generated which opens a valve between the suction tube 22 and a vacuum source (not shown) so as to apply suction to the hydration fluid in the sump 16 via the suction tube 22 and at the same time causes dispense of the washing fluid to commence. Alternatively, the washing fluid may be dispensed at a small time interval before the valve between the suction tube 22 and vacuum source is opened to ensure that the lens is held in the correct position in the well 12.

The degree of vacuum applied is such that the rate of removal of contaminated hydration fluid from the sump 16 exceeds the rate of supply of washing fluid through the nozzles 20. The net result is that the level of fluid within the well 12 starts to reduce. During this time, continued supply of washing fluid through the nozzles 20 ensures that the lens 14 is maintained in the desired position and is not sucked towards the sump 16 as a result of the vacuum applied via the suction tube 22. Thus, there is a reduced risk of the soft hydrated lens 14 blocking the sump 16 and thereby blocking the flow of fluid out of the sump 16. When the level of fluid within the well 12 falls below the tip of the second sensor 26, a signal is passed which closes the valve so that fluid is no longer withdrawn from the well 12. The lens 14 remains submerged under the fluid in the well 12 because of the action of the washing fluid which still issues through the nozzles 20. At this stage, the level of the fluid is actually spaced below the tip of the second sensor 26 because surface tension effects cause the fluid to adhere to the sensor 26 until the level has dropped sufficiently for the surface tension effect to be overcome. With the suction stopped, the level of fluid in the well 12 rises until contact with the second sensor 26 is re-established. The sensor 26 then passes a signal which re-opens the valve until the second sensor 26 indicates that the level has dropped, whereupon the suction is discontinued and the cycle repeated. Repetition of the cycle helps to ensure that as much of the contaminated hydration fluid is replaced by washing fluid as possible. Washing fluid continues to be dispensed until it reaches the first relatively high level as indicated by the sensor 24. The exchange cycle is typically about six seconds. The container is maintained under the same warm and moist conditions as for the first predetermined interval for a second predetermined interval (e.g. 10 minutes) during which time further contaminants may leach out of the lens. The container is passed to a second fluid exchange station similar to the first where the washing fluid in the well is replaced with lens storage fluid (such as 0.9% saline) by repeating the above-described fluid exchange process. The lens storage fluid is dosed at room temperature.

According to FIG. 5, four separate suction steps were performed during a predetermined procedure for the exchange of contaminated hydration fluid by washing fluid during which washing fluid continued to be supplied by the supply head 18. Then, after the last suction step, the supply of washing fluid continues until the first sensor 24 signals that the upper level has been attained.

In FIG. 5, t=0 corresponds to the end of the 5 minute interval from hydration fluid dispense. In this particular example, washing fluid dispense was commenced (t=0) marginally before the first suction step ($T_t$). This may be beneficial in reducing transient fluid currents which might disturb the positioning of the lens.

It will therefore be understood that, during this predetermined procedure, contaminated hydration fluid is removed periodically at a greater rate than washing fluid is supplied, with the result that, throughout the cycle, the lens 14 is being contacted with fresh fluid so as to ensure that effective removal by dilution of unwanted contaminants take place.

Tests carried out using Methyl Blue dye in de-ionised water in place of the hydration fluid and de-ionised water in place of the washing fluid showed by spectrophotometry that the cycle shown in FIG. 5 enables dilution factors of greater than 20 to be obtained.

In the embodiment described, the volume of the hydration fluid in the well is about 50 times greater than the volume of the wet lens. During the first predetermined interval, as equilibrium is approached, the percentage of contaminants in the fluid in the well and lens is about 98% and 2% respectively. After fluid exchange (assuming a dilution factor of about 20) and equilibrium, these percentages drop to 6.664% and 0.136%. After the second fluid exchange only about 0.47% of the original contaminants remain in he well (equilibrated between the fluid in the well and the lens).

In the above-described embodiment, the sensors 24 and 26 are electrical conductivity sensors and thus go closed circuit (c/c) when in contact with the electrically conductive hydration or washing fluid and open circuit (o/c) when they are out of contact with the hydration or washing fluid.

Operation of the above-described exchange process may be modified. For example, suction may be stopped when the second sensor 26 indicates that the fluid has passed below the relatively lower level (as described above) but not recommenced until the first sensor 24 has indicated that the fluid has reached the first, relatively higher level. In this modification fluid fluctuates substantially between the first and second levels during the exchange cycle, rather than fluctuation just above and below the second level.

Particularly with respect to the modified process, to ensure that the volume of fluid in the well is substantially at the first relatively higher level at the end of the fluid exchange cycle, the control unit is programmed to end the cycle with the fluid level rising (dose on, suction off) until the first sensor indicates that the fluid has reached the first, relatively higher level from below (i.e. the first conductivity sensor 24 goes from o/c to c/c).

In order to ensure that the lens 14 has been subjected to the correct predetermined procedure, a control unit is provided which times when the sensors 24 and 26 go open circuit and closed circuit and also counts the number of times this takes place. By checking that the sensors 24 and 26 operate in the desired sequence and within the required time window, it can be established whether or not the correct fluid exchange process has been followed. For example, if either of the supply nozzles 20 become blocked or if the suction tube becomes blocked, then the control unit senses that the required exchange process has not taken place and issues a signal which causes the lens to be rejected. Rejection can take place by "marking" of the container 10 containing the lens to be rejected, with subsequent rejection taking place at some point downstream of the fluid exchange process, for example at the time the container 10 would otherwise be sealed if the lens had not been marked for rejection.

It will be appreciated that, in practice, during mass production of soft contact lenses, the production line will advance pallets containing one or more rows of lenses 14 in respective containers 10 on a conveyor belt through first and second fluid exchange stations at each of which there is an array of supply heads 18 and suction tubes 22 for the respective containers. "Marking" of the containers for rejection is conveniently effected by the control unit registering and storing the specific pallet and position in that pallet of the container to be rejected. Then, after removal of contaminants by fluid exchange and replacement of the washing fluid with 0.9% saline in which the lenses are to be stored, the pallets of lenses in the containers are passed to a further station where sealing of the wells 12 for storage, transport and sale takes place. After sealing, the wells are sterilised (autoclave or UV) and visually inspected for physical imperfections (tears, scratches, ragged edges etc).

What is claimed is:

1. A method of treating a contact lens disposed in a well containing hydration fluid, such that a concave surface of the lens faces upwardly and the lens is submerged in the hydration fluid, thereby allowing contaminants to leach out of the lens into the hydration fluid, comprising the step of:
   introducing, after hydration of the lens is complete, a washing fluid into the well and removing contaminated hydration fluid from the well so as to replace at least some of the contaminated hydration fluid in the well with the washing fluid in a predetermined fluid-exchange procedure,
   wherein the washing fluid is introduced into the well so as to be directed against the concave surface of the lens and the contaminated hydration fluid is removed at a removal location remote from where the washing fluid impinges against the lens, such that the action of the introduced washing fluid serves to oppose movement of the lens towards the removal location, and further wherein the contaminated hydration fluid is removed in at least two separate steps during which removal of the contaminated hydration fluid takes place at a greater rate than introduction of the washing fluid, the removal and introduction being timed so that sufficient fluid remains in the well to ensure that the lens remains submerged.

2. The method of claim 1 wherein the washing fluid comprises a lens storage fluid.

3. The method of claim 1 wherein the well is a well in which the contact lens is sealed and stored for distribution and sale, and the method further includes the step of sealing the well with the contact lens therein.

4. The method of claim 1, wherein, prior to introducing the washing fluid, the following steps are effected:
 (i) introducing the lens hydration fluid into the well directed against the upwardly facing concave surface of the lens so as to control the position of the lens within the well, until the lens is submerged; and
 (ii) allowing sufficient time for the lens to hydrate and for contaminants to leach from the lens.

5. The method of claim 1, wherein the washing fluid is introduced in at least two streams.

6. The method as claimed in claim 5, wherein the streams are mutually inclined so as to be directed against different regions of the lens.

7. The method of claim 1 further comprising the step of removing contaminated washing fluid and replacing it with a fluid at least partially comprising lens storage fluid.

8. The method of claim 1 further comprising the step of monitoring the predetermined fluid-exchange procedure, whereby to establish whether the predetermined fluid-exchange procedure has been correctly performed.

9. The method of claim 8 wherein the step of monitoring includes utilizing first and second level sensors for sensing the level of fluid in the well, the first level sensor being arranged to signal when the level of the fluid is at a first, relatively higher, level and the second sensor being arranged to signal when the level of the fluid in the well is at a second, relatively lower, level.

10. The method of claim 9 wherein the level of fluid removal is stopped and started under the control of the second sensor.

11. The method of claim 9 wherein the fluid removal is stopped when the second sensor indicates that the fluid has passed below the second level, and is started when the first sensor indicates that the fluid has reached the first level, so that the fluid fluctuates between the first and second levels.

12. The method of claim 9, wherein the hydration fluid is introduced into the well until the first sensor indicates that the level of fluid as at the first level.

13. The method of claim 9, wherein the positioning of the second sensor is such as to ensure that the lens remains submerged throughout the fluid-exchange procedure.

14. A method of treating a contact lens disposed in a well containing hydration fluid, such that a concave surface of the lens faces upwardly and the lens is submerged in the hydration fluid, thereby allowing contaminants to leach out of the lens into the hydration fluid, comprising the step of:
 introducing, after hydration of the lens is complete, a washing fluid into the well and removing contaminated hydration fluid from the well so as to replace at least some of the contaminated hydration fluid in the well with the washing fluid in a predetermined fluid-exchange procedure,
 wherein the washing fluid is introduced into the well so as to be directed against the concave surface of the lens and the contaminated hydration fluid is removed at a removal location remote from where the washing fluid impinges against the lens, such that the action of the introduced washing fluid serves to oppose movement of the lens towards the removal location, and further wherein removal of the contaminated hydration fluid takes place at a greater rate than introduction of the washing fluid, the removal and introduction being timed so that sufficient fluid remains in the well to ensure that the lens remains submerged.

15. A method of treating a contact lens disposed in a well containing hydration fluid, such that a concave surface of the lens faces upwardly and the lens is submerged in the hydration fluid, thereby allowing contaminants to leach out of the lens into the hydration fluid, comprising the steps of:
 introducing, after hydration of the lens is complete, a washing fluid into the well and removing contaminated hydration fluid from the well so as to replace at least some of the contaminated hydration fluid in the well with the washing fluid in a predetermined fluid-exchange procedure, and
 monitoring the predetermined fluid-exchange procedure, whereby to establish whether the predetermined fluid-exchange procedure has been correctly performed, said monitoring step utilizing first and second level sensors for sensing the level of fluid in the well, and the first level sensor being arranged to signal when the level of the fluid is at a first, relatively higher, level and the second sensor being arranged to signal when the level of the fluid in the well is at a second, relatively lower, level.

16. The method as claimed in claim 15, wherein a predetermined volume of the lens hydration fluid is introduced into the well; following which the hydration fluid is removed from the well whilst supplying the washing fluid into the well, the rate of removal of the hydration fluid being greater than the introduction rate of the washing fluid so that the fluid level reduces until the second sensor indicates the level of fluid has reached the second level; following which fluid removal is stopped and subsequently fluid introduction is also stopped when the first sensor indicates that the level of fluid is at the first level; and the monitoring step includes checking that the sensors have signaled in the correct sequence and the correct times having regard to the predetermined fluid-exchange procedure.

17. The method of claim 15, wherein the fluid removal during the fluid-exchange procedure is conducted in more than one discrete step.

18. The method of claim 15, wherein the level of the fluid in the well fluctuates around the lower level, and the fluid removal is stopped and started under the control of the second sensor.

19. The method of claim 15, wherein the fluid removal is stopped when the second sensor indicates that the fluid has passed below the second level, and is started when the first sensor indicates that the fluid has reached the first level, so that the fluid fluctuates between the first and second levels.

20. The method of claim 15, wherein the hydration fluid is introduced into the well until the first sensor indicates that the level of fluid is at the first level.

21. The method of claim 15, wherein the positioning of the second sensor is such as to ensure that the lens remains submerged throughout the fluid-exchange procedure.

22. The method of claim 15 wherein the well is a well which is adapted to be sealed and stored for distribution and sale, and the method further includes the step of sealing the well with the contact lens therein.

23. The method of claim 15 wherein the washing fluid comprises a lens storage fluid.

24. The method of claim 15, wherein, prior to introducing the washing fluid, the following steps are effected:
 (i) introducing the lens hydration fluid into the well directed against the upwardly facing concave surface of the lens so as to control the position of the lens within the well, until the lens is submerged; and
 (ii) allowing sufficient time for the lens to hydrate and for contaminants to leach from the lens.

25. The method of claim 15 wherein the washing fluid is introduced in at least two streams.

26. The method of claim 25 wherein the streams are mutually inclined so as to be directed against different regions of the lens.

* * * * *